United States Patent

[11] 3,601,659

[72] Inventor Sinya Tanaka
 Tokyo, Japan
[21] Appl. No. 873,215
[22] Filed Nov. 3, 1969
[45] Patented Aug. 24, 1971
[73] Assignee Sanken Electric Company, Limited
 Saitama-ken, Japan
[32] Priority May 1, 1969
[33] Japan
[31] 44/34239 and 44/34238

[54] REVERSE CURRENT DETECTOR UTILIZING THYRISTORS AND GATE SIGNAL INHIBITING CIRCUITRY
 8 Claims, 11 Drawing Figs.
[52] U.S. Cl. .................................................. 317/43,
  317/27, 307/85, 307/52
[51] Int. Cl. ......................................................... H02h 3/28,
  H02h 3/38

[50] Field of Search............................................ 317/43, 39,
 26, 27; 307/127, 80, 85, 86, 51, 52, 60; 323/24

[56] References Cited
UNITED STATES PATENTS
3,353,029 11/1967 Rolfes ........................... 307/86 X
3,453,495 7/1969 Thomas......................... 317/43 X Primary Examiner—J. D. Miller
Assistant Examiner—Harvey Fendelman
Attorney—Brufsky, Staas, Breiner and Halsey ABSTRACT: A thyristor circuit device constructed so that thyristor switches are used as protectors in the network system and a forward current can flow without being disturbed in any way but a reverse current is suppressed when it results and is completely cut off as occasion demands by applying to the gates of said thyristor switches a firing signal having a pulse duration determined within the limited time between the point of time corresponding to 90° phase angle of lead and the point of time corresponding to 90° phase angle of lag, taking a phase voltage of line as the reference point.

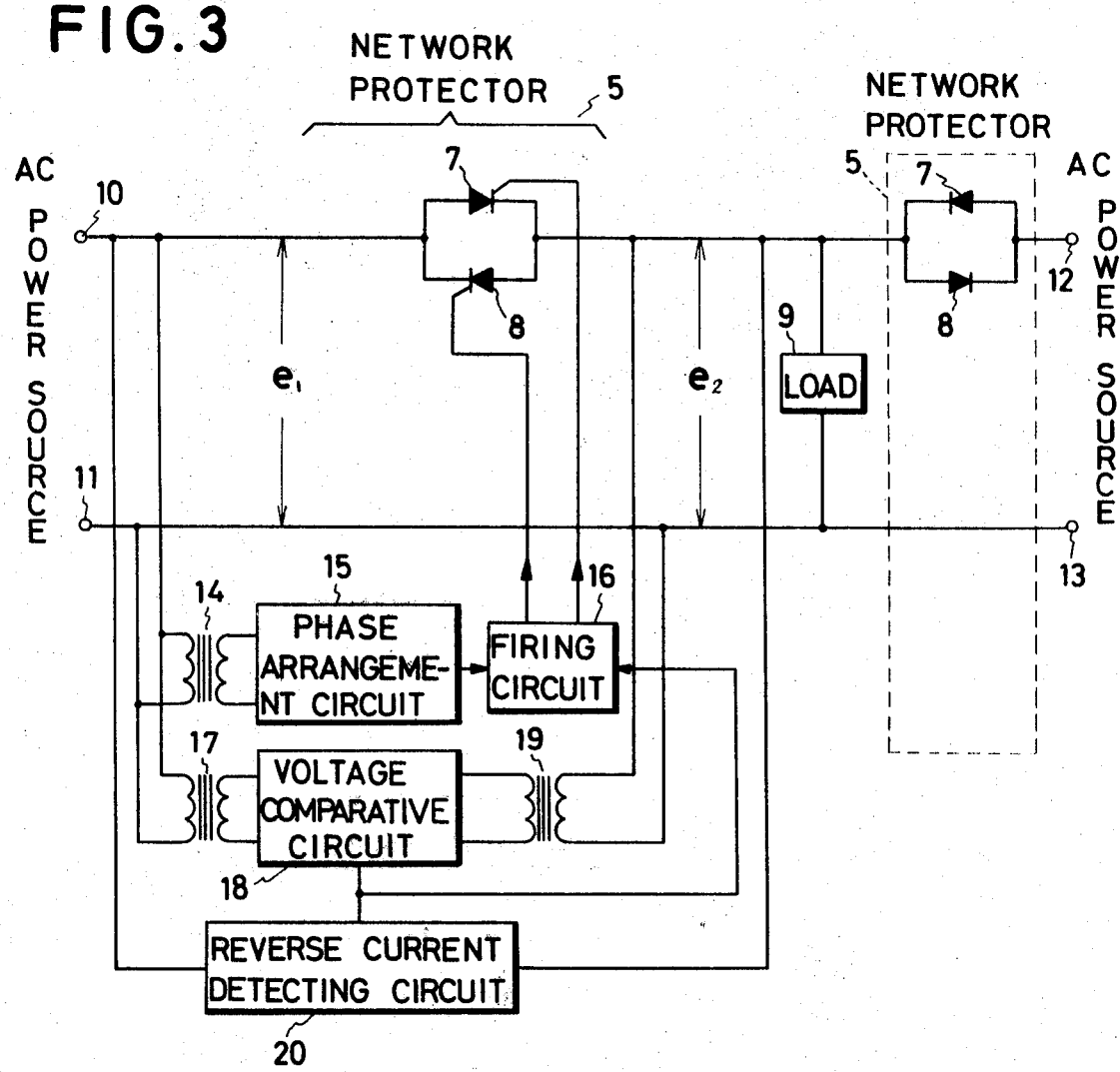
FIG.3
FIG.4
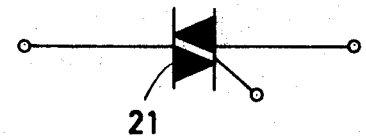

REVERSE CURRENT DETECTOR UTILIZING THYRISTORS AND GATE SIGNAL INHIBITING CIRCUITRY

BACKGROUND OF THE INVENTION

This invention relates to a thyristor circuit device, and more particularly to a thyristor-type network protector. With overgrowing and advancement of modernization of cities in recent years, electric power suspension is not allowed even for a moment and high reliability of power supply is required. In order to satisfy the above-stated requirements, a network system is well known, in which a plurality of circuits are used to supply power to loads, and therefore, if a part of circuits is at fault, the remaining circuits can continue to supply power.

In the above-mentioned network system, network protectors are used to separate troubled circuits from others. The functions required for a network protector connected to a network are as follows.

1. To automatically cut off a reverse current when it results.
2. To select the condition for normal supply of power when the electric suspension is restored and to automatically turn the circuits on.

To accomplish these purposes, complicated control circuits have been required so far and the switch of network protector has been required to have a capacity large enough to permit the interruption of a high reverse current to be developed at the time of short circuit in a power source. In addition, since this operation of switch is required only once or twice a year, there has been always felt an uneasiness as to the reliability of mechanically composed devices of prior art.

SUMMARY OF THE INVENTION

The object of this invention is to provide a thyristor circuit device which automatically suppresses a reverse current alone without disturbing a forward current in any way and then interrupts said reverse current.

Another object of this invention is to provide a device which automatically detects the condition required to open the circuit and actuates a thyristor switch.

Still another object of this invention is to provide a device which decides conditions of a network when the electric suspension is restored and automatically throws a thyristor switch in.

Further object of this invention is to provide a network protector of simple construction.

Yet further object of this invention is to provide a highly reliable network protector.

Still further object of this invention is to provide a device which detects a reverse current easily.

New characteristic feature of this invention is that a device incorporating this invention consists of an AC network having a plurality of power sources, thyristor switches connected to the lines of said AC network in series and a thyristor device which applies as a firing signal to the gate of said thyristor switch a voltage having a pulse duration determined within the time between the point of time corresponding to 90° phase angle of lead and the point of time corresponding to 90° phase angle of lag, taking as the reference point the point of time when a phase voltage of said AC network rises from the zero voltage. The other aspects, objects, characteristic features or advantages of this invention will become apparent from the ensuing description, which should be read in conjunction with the attached drawings illustrating embodiments of this invention.

BRIEF DESCRIPTION OF THE DRAWINGS

FIG. 3 is a block diagram of network protectors in a single phase circuit which illustrates the principle of this invention.

FIG. 4 shows a bidirectional triode thyristor.

DESCRIPTION OF THE PREFERRED EMBODIMENTS

Figure 1:
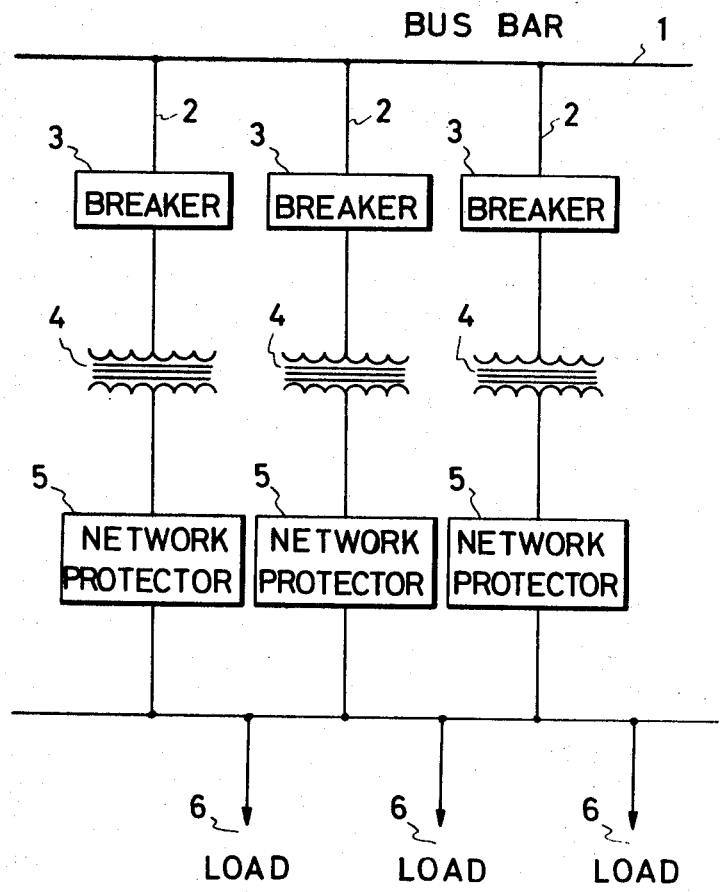
FIG. 1 is a block diagram of a power supply circuit with plurality of feeder lines wherein network protectors according to this invention are being used.

Referring now to FIG. 1, a network consists of a bus bar 1 and a plurality of feeder lines 2 having breakers 3, transformers 4 and network protectors 5. If one of feeder lines has some trouble, the remainder can supply power to loads 6. Supposing that a trouble is in a transformer 4 of one of feeder lines 2, it is necessary to interrupt the supply of power from the bus 1 by means of a breaker 3. At the same time, it is necessary to interrupt a reverse current by means of the network protectors 5, because said reverse current flows on other feeder lines from the loads 6 to the transformers 4 through the network protectors 5. The thyristor circuit device of this invention is used in this network protector.

Figure 2:
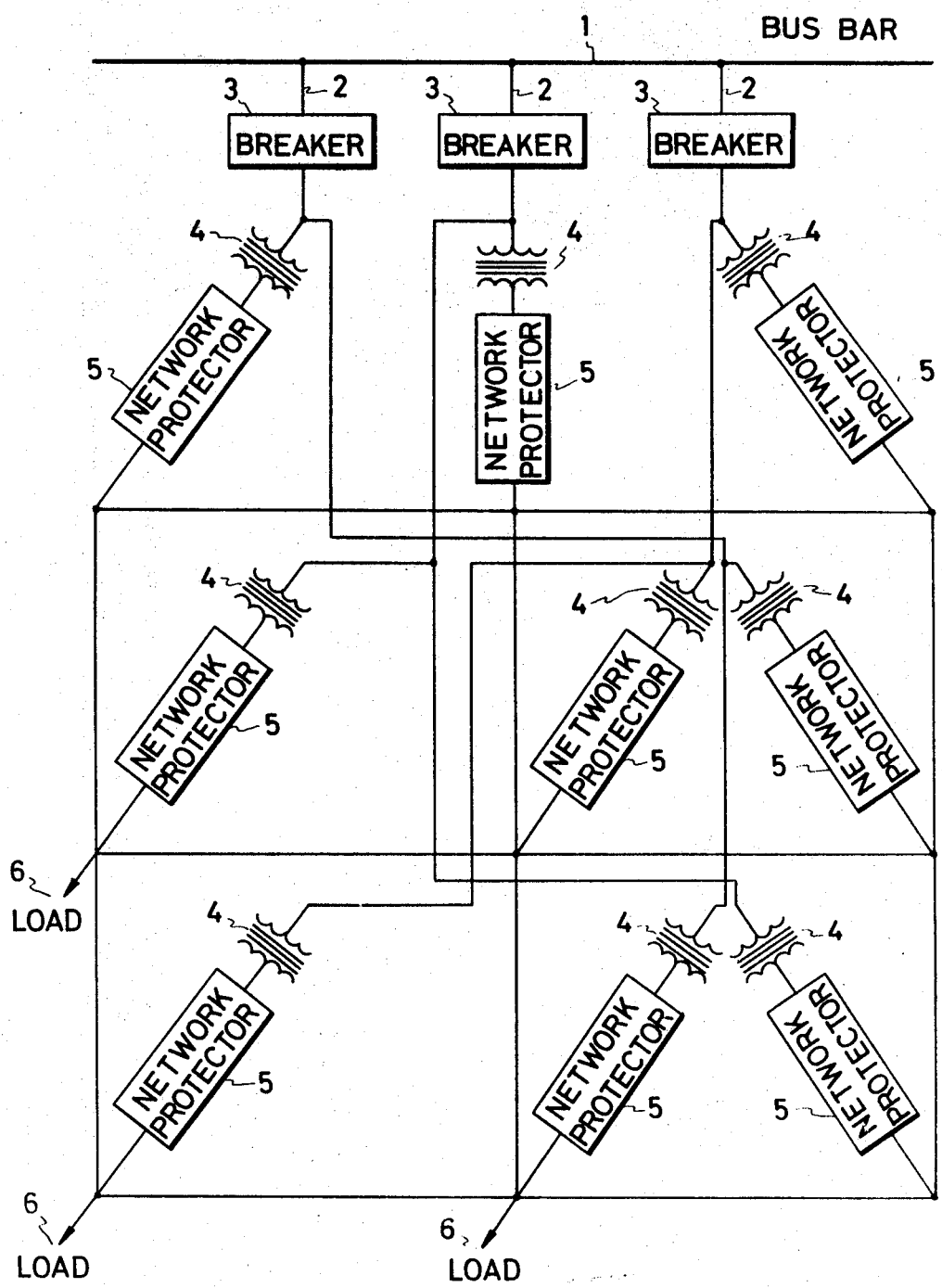
FIG. 2 is a block diagram of a network system circuit wherein network protectors of this invention are being used.

Another example of use of network protector is shown in FIG. 2, in which network protectors are installed in every place of a network system.

FIG. 2 illustrates a network formed in a matrix which is called a network system. A secondary matrix circuit is composed of a bus bar 1, feeder lines 2, breakers 3, transformers 4 and network protectors 5. Power is supplied to loads 6 from said matrix circuit. Similarly as in FIG. 1, if a trouble takes place in any place, power supply is interrupted by means of a breaker 3, and at the same time a reverse current is prevented by means of the network protectors 5.

The use of a thyristor circuit device of this invention is not limited to circuit system shown in FIG. 1 and 2. It can be used in networks of other types having a plurality of power sources.

FIG. 3 shows a thyristor circuit device of this invention being used in a single-phase circuit. Power is supplied to a load 9 by connecting an AC power source to terminals 10 and 11 and by connecting another AC power source to terminals 12 and 13. A network protector 5 incorporating a thyristor circuit device consists of thyristors 7 and 8, a transformer 14, a phase arrangement circuit 15, a firing circuit 16, transformers 17 and 19, a voltage comparative circuit 18 and a reverse current detecting circuit 20. Although two network protectors 5 are located on both sides of the load 9, the illustration of another protector is omitted because they are of the same construction. To the gates of the thyristors 7 and 8 is applied as a firing signal a voltage having a pulse duration determined within the time between the point of time corresponding to 90° phase angle of lead and the point of time corresponding to 90° phase angle of lag, taking as the reference point the point of time when a phase voltage $e_1$ rises from the zero voltage. For the above-described purpose, a phase voltage $e$ is detected by means of the transformer 14 and a desired phase angle is set by means of the phase arrangement circuit 15 and finally the firing signal satisfying the above-mentioned condition is developed by means of the firing circuit 16. By applying said firing signal to the thyristors 7 and 8, a forward current can flow without being interrupted in any way and a reverse current is suppressed to a low value.

In FIG. 3, the reverse current detecting circuit 20 is provided to detect a reverse current when it results and to completely turn off the thyristors 7 and 8. said reverse current detecting circuit 20 detects the change in voltage value between the anodes and the cathodes of the thyristors 7 and 8 when a reverse current is developed and accordingly prevents firing signals from being applied to the thyristors 7 and 8 from the firing circuit 16. The voltage comparative circuit 18 compares voltage $e_1$ and $e_2$ at both ends of the thyristors 7 and 8 by means of the transformers 17 and 19, and detects a condition that a reverse current is not developed again by firing the thyristors, namely a condition $e_1 > e_2$. Said voltage comparative circuit 18 is formed by differential amplifier which is well known. For example, TRANSISTOR CIRCUIT ANALYSIS AND DESIGN, published June 1960, on page 213, there is described, by Franklin C. Fitchen, said differential amplifier.

Further the voltage comparative circuit 18 is connected to the firing circuit 16 that fires the thyristors after a reverse current condition has been cleared. It will be understood that a bidirectional triode thyristor 21 shown in FIG. 4 can be used instead of the thyristors 7 and 8 shown in FIG. 3. The thyristor circuit device of FIG. 3 will be more clearly understood by referring to waveforms of FIG. 5, 6, 7 and 8.

Figure 5:
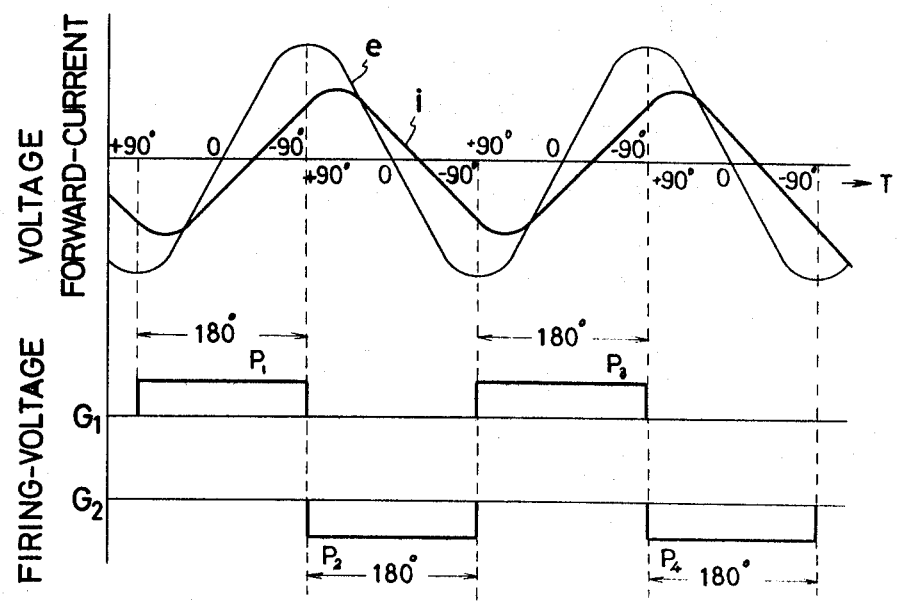
FIG. 5 shows waveforms illustrating the relationship between forward current, phase voltage and firing signal.

In FIG. 5, to the gates of thyristors 7 and 8 of a circuit, to which a sinusoidal AC voltage $e$ is being supplied, are applied as a firing signal pulses having the time duration corresponding to 180°, that is, the total period of time from the point of time corresponding to 90° phase angle of lead to the point of time corresponding to 90° phase angle of lag, taking as the reference point the point of time when a phase voltage, namely a sinusoidal AC voltage $e$ rises from the zero voltage.

In other words, a firing voltage $G_1$ is applied to the thyristor 7 and is related to a positive half-cycle of AC voltage $e$. A firing voltage $G_2$ is applied to the thyristor 8 and is related to a negative half-cycle of AC voltage $e$.

Figure 6:
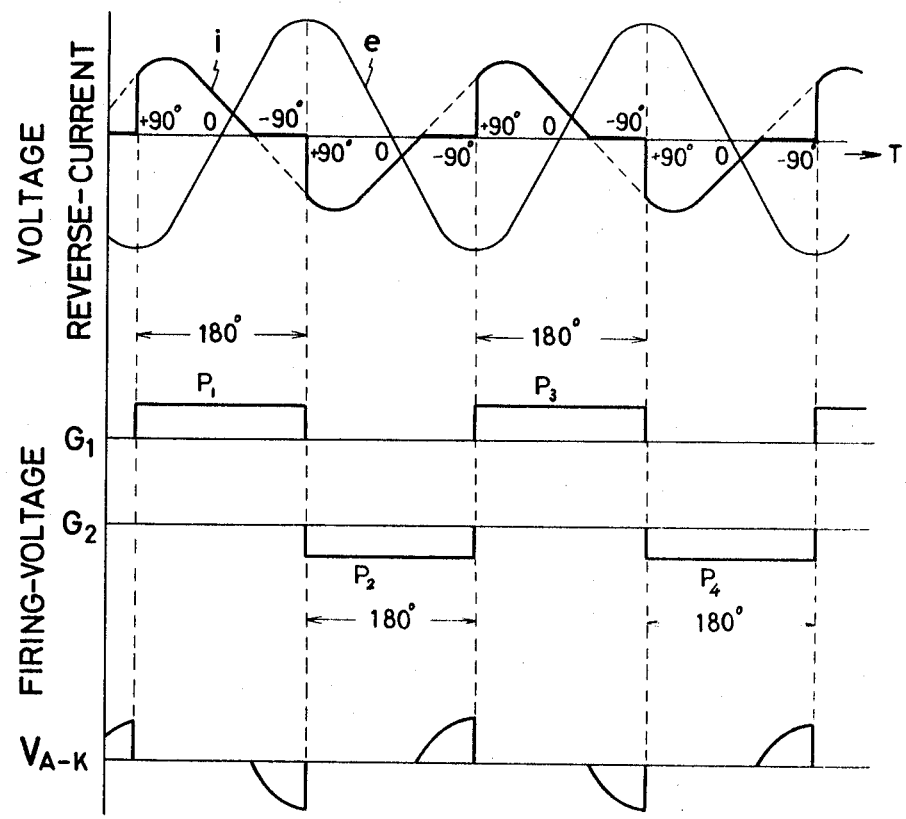
FIG. 6 shows waveforms illustrating reverse current in firing signal, similarly to FIG. 5.

Pulses $P_1$, $P_2$, $P_3$ and $P_4$ of firing voltage are applied to the thyristors only for the limited period of time. However, all forward currents rise within a time from 90° phase angle of lead to 90° phase angle of lag in relation to the phase voltage $e$ and therefore they flow without being disturbed. When a reverse current is produced, however, it is suppressed. Waveforms to be obtained when a reverse current is developed are shown in FIG. 6. Pulses $P_1$, $P_2$, $P_3$ and $P_4$ of the firing voltages $G_1$ and $G_2$ of the thyristors 7 and 8 are the same as those shown in FIG. 5.

When a state of reverse current is developed, a reverse current $i$ will become a suppressed value. If a firing voltage is applied to the gate of the thyristor for all periods of time in other ways than this invention, a reverse current will flow to the portion indicated by dotted lines, too. According to this invention, no firing signal exists at the time of rise of a reverse current. Therefore, the reverse current will not flow at once but flow at the point of time when 90° phase angle of lead is obtained in relation to a phase voltage.

Even in the case of short circuit in the power source, a short circuit current of a reverse current is instantaneously suppressed. Furthermore, according to this invention, a voltage between the anode and the cathode of the thyristor can be detected as $V_{AIK}$ as shown in FIG. 6. Therefore, it is possible to turn the thyristors off by knowing the development of reverse current in accordance with the change in $V_{AIK}$. In the normal network system, the circuits are completely opened to interrupt a reverse current when it results, but in some special networks there is a circuit which is not required to be opened even if a reverse current is developed. In the case of such circuits, it is possible just to suppress a reverse current by the circuit of this invention. At this time, the operation of the reverse current detecting circuit and voltage comparative circuit is not required.

Figure 7:
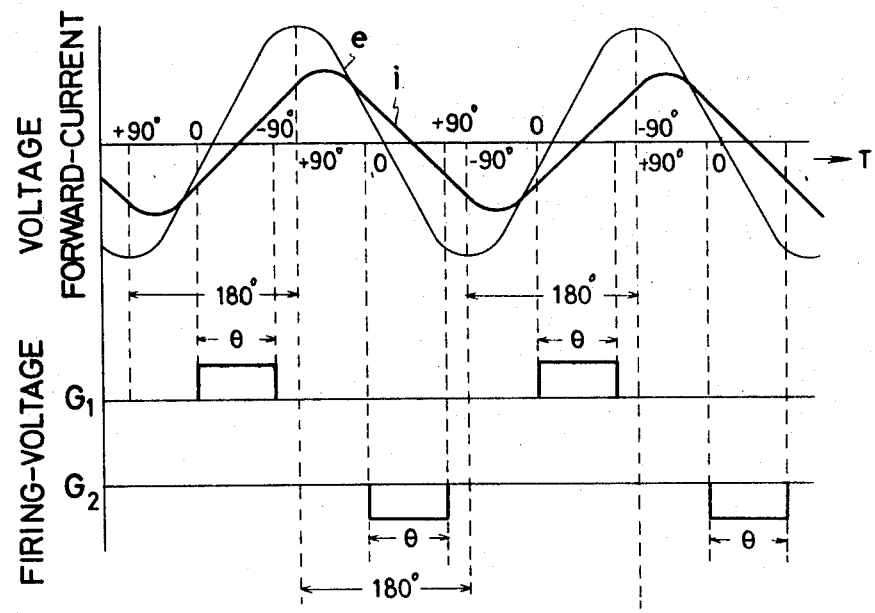
FIG. 7 shows waveforms illustrating another embodiment of the forward current and firing signal according to this invention.
Figure 8:
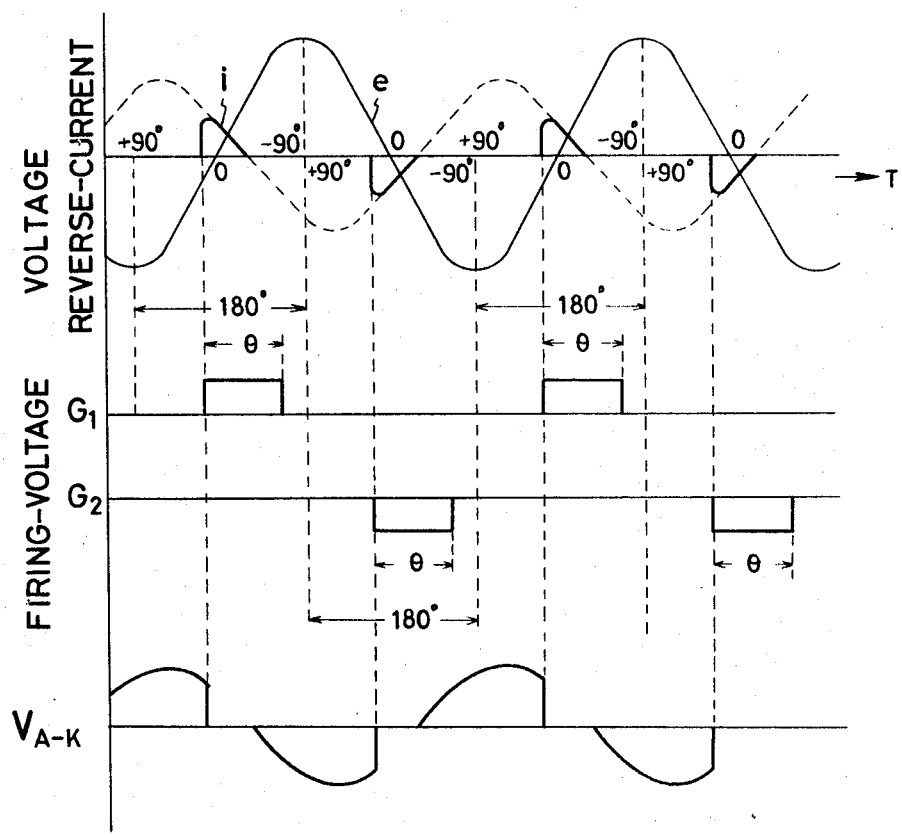
FIG. 8 shows waveforms illustrating reverse current in firing signal, similarly to FIG. 7.

Referring now to FIG. 7 and 8, another example of firing signal according to this invention is described below. In a case when a phase of voltage and current to be supplied to a load, namely, power factor is relatively invariable, it is not necessary to have a pulse duration of firing signal which corresponds to 180° as shown in FIG. 5 and 6. In other words, if phase relation between a voltage $e$ and a current $i$ is as shown in FIG. 7, the pulse duration of a firing voltage to be applied to a thyristor gate will suffice to be $\theta$ as shown in the drawing. Since a firing voltage exists at the time of the rise of forward current, it is possible to flow forward current without any difficulty. When a reverse current state is developed, a reverse current does not flow, because there is no firing signal at the time of the rise of reverse current as shown in FIG. 8. A suppressed reverse current flows only when there exists a firing signal. If more than of this suppression is required, that is, complete opening of circuit is desired, the thyristors are turned off by knowing the development of a reverse current after detecting a voltage between the anode and the cathode of the thyristor as $V_{AIK}$ of FIG. 8.

The firing signal shown in FIG. 7 and 8 is used only for a special circuit device wherein a power factor is nearly constant. It will be understood that for design reason the pulse duration of firing signal need not be strictly limited to the time between 90° phase angle of lead and 90° phase angle of lag but can be somewhat longer or shorter.

It will be also understood that the firing voltage is not limited to be square pulse but can be a signal to be produced by high frequency voltage.

An embodiment of network protector in a three-phase power source circuit is explained below, reference being made to FIG. 9, 10 and 11.

Figure 9:
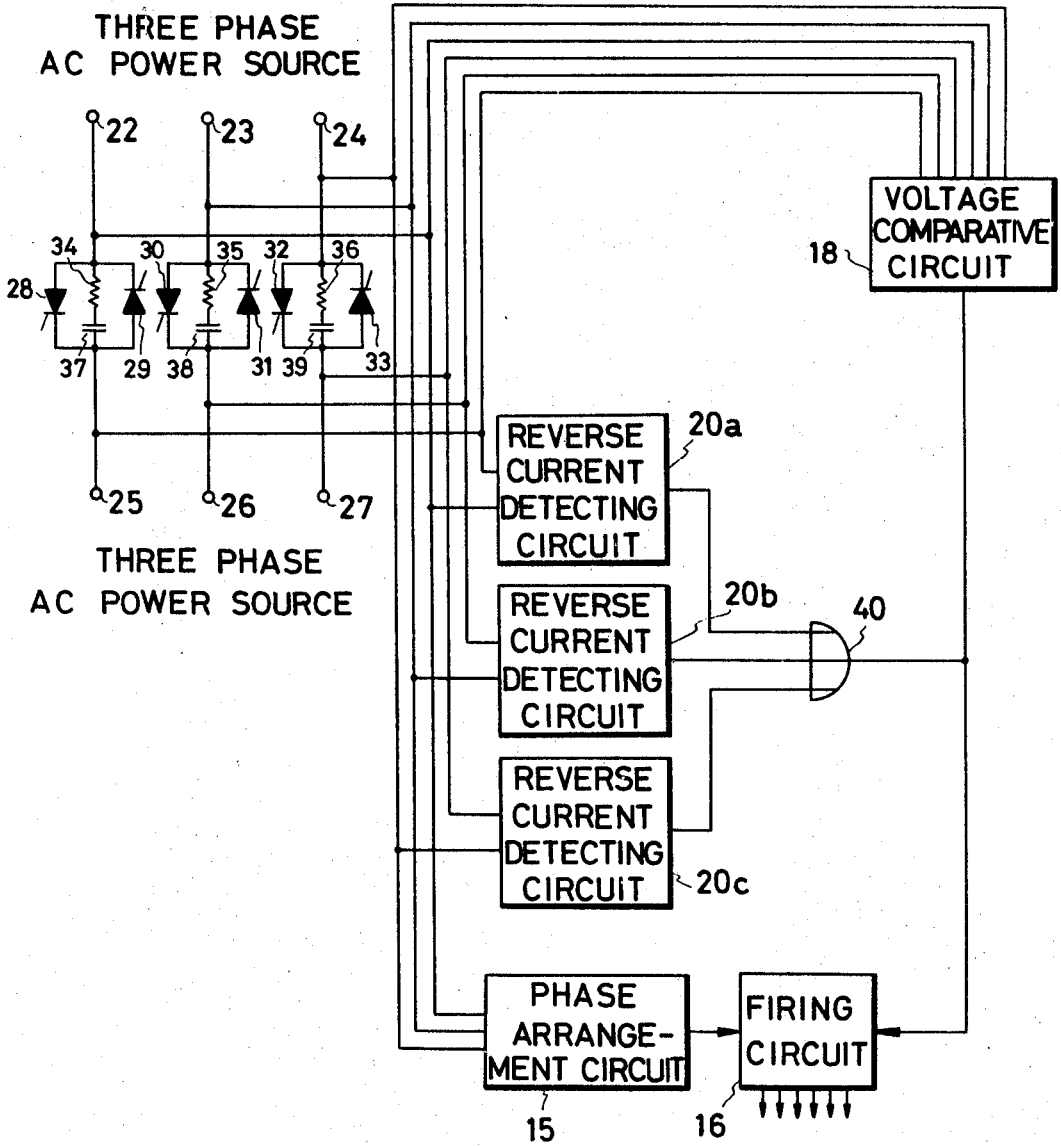
FIG. 9 is a block diagram illustrating network protectors in a three phase power source circuit.

In FIG. 9, terminals 22, 23 and 24 are connected to a three-phase AC power source and terminals 25, 26 and 27 are connected to another three-phase AC power source. Thyristors 28, 29, 30, 31, 32 and 33 are connected to lines in parallel in reversed polarity and resistors 34, 35 and 36 and condensers 37, 38 and 39 are connected to both ends of thyristors as protective circuit. Firing signals are given to a thyristor gate from a firing circuit 16 according to a phase arrangement circuit 15. When a reverse current results, the firing circuit 16 is controlled by reverse current detecting circuits 20a, 20b and 20c so as not to give firing signal to the thyristors. In this case, a reverse current signal is obtained from an OR circuit 40, no matter which one of the reverse current detecting circuits 20a, 20b or 20c is actuated. A voltage comparative circuit 18 is connected to decide a condition required to conduct the thyristors again. The basic operation of the network protectors of three-phase circuit shown in FIG. 9 is the same as that of the single-phase circuit.

Figure 10:
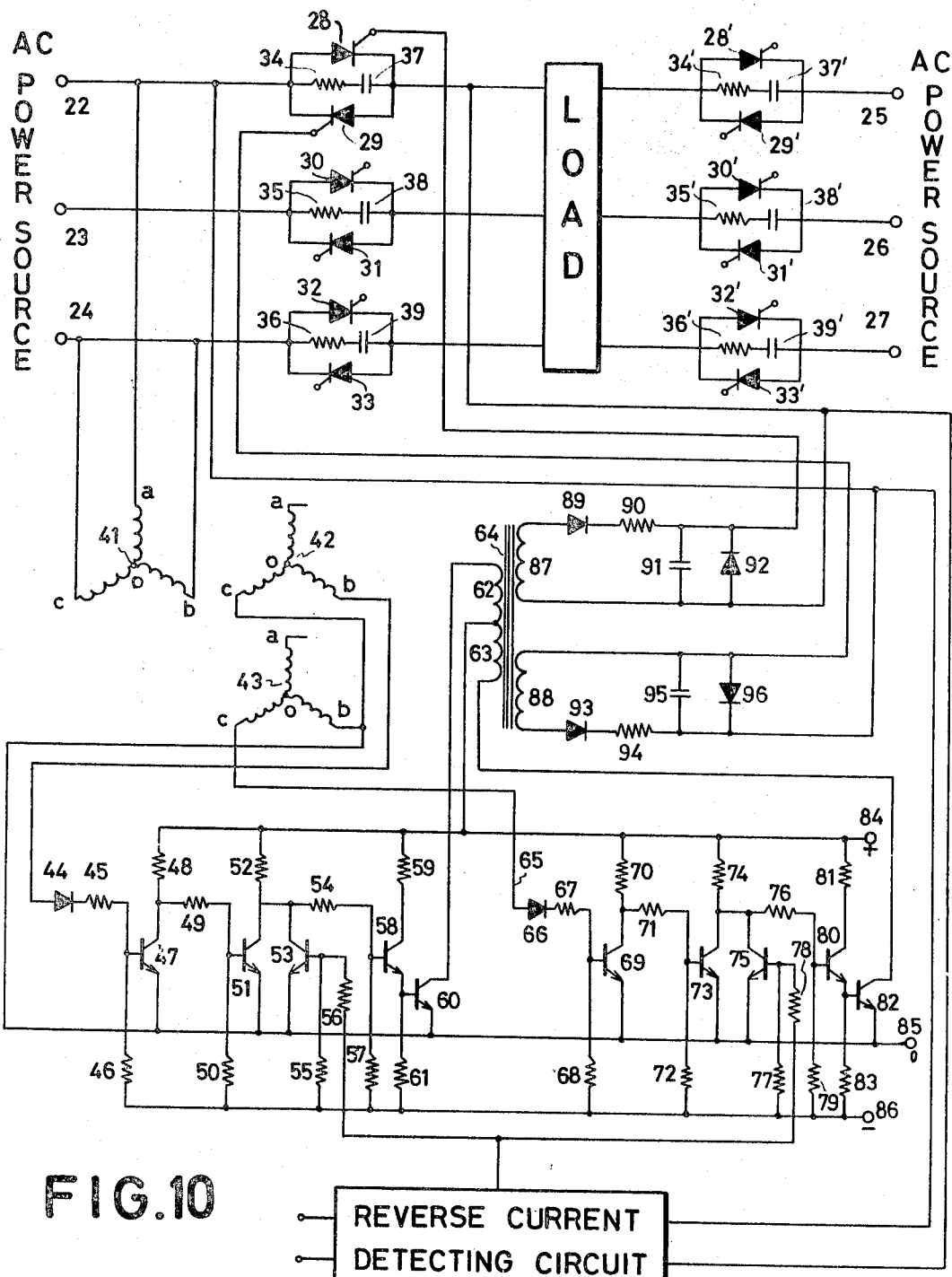
FIG. 10 is a circuit diagram illustrating in detail a phase arrangement circuit and a firing circuit of a thyristor circuit device in a three-phase power source circuit.

FIG. 10 illustrates in detail a phase arrangement circuit and a firing circuit in a three-phase AC power source circuit. In FIG. 10, power is supplied to a load 9 from a network protector using thyristors 28, 29, 30, 31, 32 and 33 and a network protector using thyristors 28', 29', 30', 31', 32', and 33'. A phase arrangement circuit is composed of a star-connected transformer 41 and its secondary star-connected windings 42 and 43. If firing voltage having 90° phase angle of lead is to be obtained for voltage of phase $a$, a line voltage between $c$ and $b$ will be used. This will be easily understood by use of a vector diagram. At the time of negative half-cycle, the purpose of firing signal will be accomplished by using a line voltage between $b$ and $c$.

First of all, firing signal of the thyristor 28 is explained. A voltage between $b$ and $c$ of the secondary winding 42 of the transformer 41 connected to a three-phase AC power source is detected, rectified by means of a diode 44 and then applied to the base of a transistor 47 for detection from between the resistors 45 and 46. As a result, the transistor 47 for detection is actuated. By the operation of the transistor 47, a transistor 53 of the next stage is turned off. In other words, a bias voltage developed by resistors 49 and 50 connected between a collector and a resistor 48 operates to turn a transistor 51 off.

When the transistor 51 is turned off, a bias voltage produced by resistors 52, 54 and 57 turns a transistor 58 on. The transistor 58 having resistors 59 and 61 acts as a transistor for amplification. The output from the emitter of said transistor 58 is applied to the base of a transistor 60. Therefore, the transistor 60 is put into action and a current flows to the primary winding 62 of a transformer 64. A voltage is induced in a secondary winding 87 by means of the current of said primary winding 62 and a firing signal is applied to the gate of the thyristor 28 through a diode 89 and a resistor 90. A condenser 91 and a diode 92 of the firing circuit are for surge absorption. By means of this circuit it is possible to apply to the gate of the thyristor a firing signal having the pulse duration corresponding to 180° at 90° phase angle of lead, taking as the reference point the point of time when a phase voltage rises from the zero voltage. Furthermore, to this circuit is provided a circuit which turns the thyristor off when a reverse current is developed. In other words, a voltage between the anodes and the cathodes of thyristors 28 and 29 is detected by a reverse current detecting circuit 18 and accordingly a signal is given to the base of the transistor 53 through a resistor 56. When the transistor 53 operates, a bias voltage produced by resistors 52, 54 and 57 acts to turn the transistor 58 off, that is, the production of firing signal is stopped. Therefore, the thyristors are turned off.

So far the description has been made on the firing signal of the thyristor 28. The same circuit composition apply to the firing signal of the thyristor 29.

In other words, a voltage between b and c of the secondary winding 43 of the transformer 41 is applied to the firing circuit by means of a lead wire 65. This circuit consists of a diode 66, resistors 67 and 68, a transistor 69, resistors 70, 71 and 72, a transistor 73, a resistor 74, a transistor 75, resistors 76, 77, 78 and 79, a transistor 80, a resistor 81, a transistor 82, a resistor 83, a positive bias terminal 84, a zero bias terminal 85, a negative bias terminal 86, a secondary winding 88 of the transformer, a diode 93, a resistor 94, a condenser 95 and a diode 96.

In FIG. 10, only one phase is shown with other two phases omitted.

Below is given an embodiment of a reverse current detecting circuit.

Figure 11:
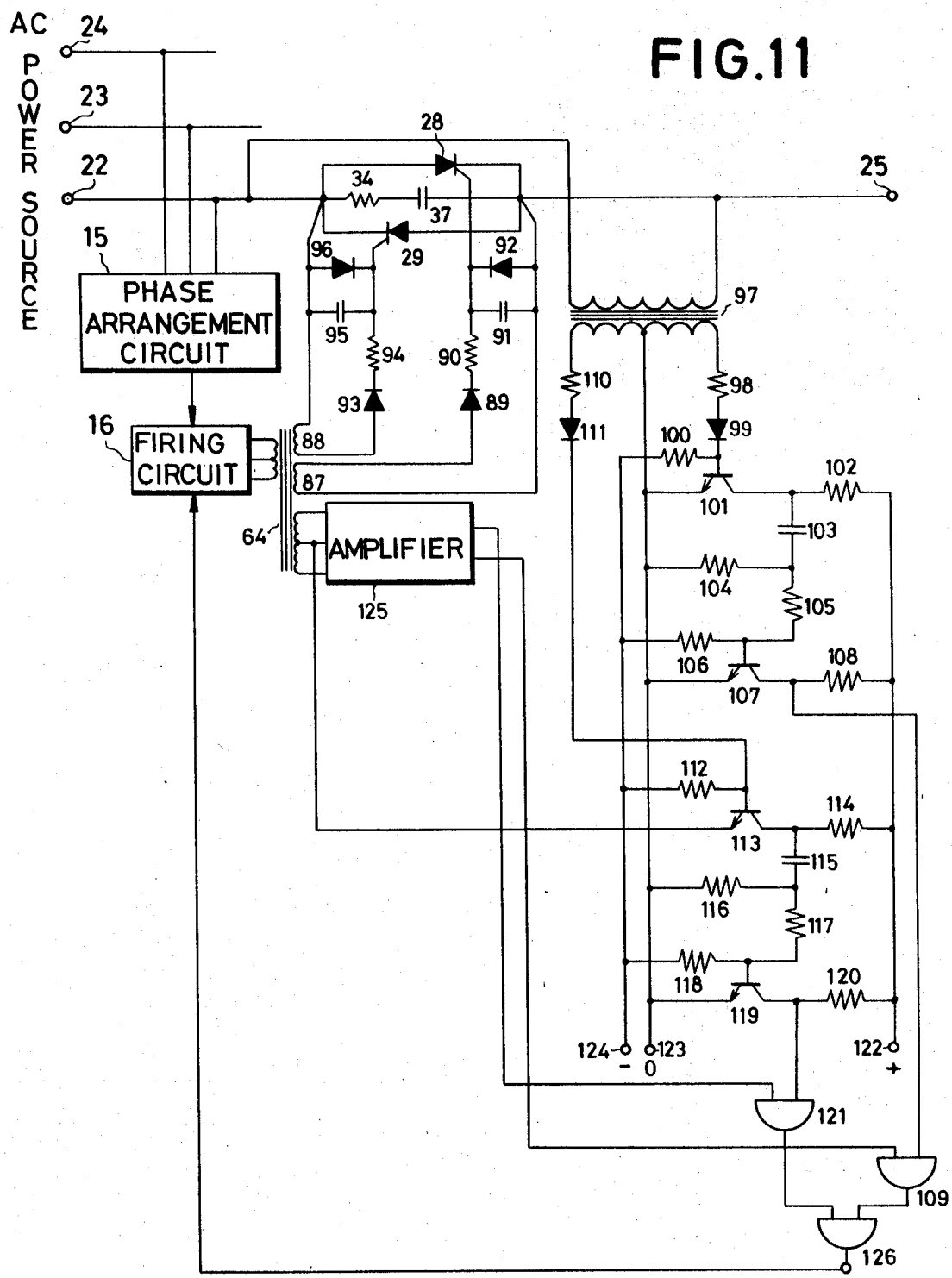
FIG. 11 is a diagram of a reverse current detecting circuit.

FIG. 11 shows a reverse current detecting circuit. Although the circuit is a three-phase circuit, omission is made to show only one phase. In this circuit, a voltage between the anode and the cathode of thyristors 28 and 29 is detected by means of a transformer 97. Supposing that an AC power line is now in the state of reverse current, a voltage between the anode and cathode is detected as $V_{A1K}$ as shown in FIG. 6. Therefore, a forward bias is applied to the base of a transistor 101 by means of said detected voltage through a resistor 98, a diode 99 and a resistor 100. This forward bias turns the transistor 101 on.

The voltage between the anode and the cathode, however, sharply changes as shown by $V_{A1K}$ curve in FIG. 6 at the time when the firing signal is applied. Therefore, at this time differential pulses are produced from a differentiation circuit consisting of a resistor 102, a condenser 103 and a resistor 104. Said differential pulse is applied to the base of the transistor 107 through resistors 105 and 106, as a result of which the transistor 107 is conducted for an instant. Then, said differential pulse is applied to an AND circuit 109 by means of a circuit connected between a collector and a resistor 108. To said AND circuit is applied a firing signal of the thyristor as another input signal through an amplifier 125.

If a firing voltage G exists as shown in FIG. 6 and the change of a voltage $V_{A1K}$ between the anode and the cathode exists, the AND circuit 109 is caused to operate receiving two signals. As a result of this, the output of the AND circuit 109 is applied to an OR circuit 126. Then, the signal from said OR circuit 126 acts to stop producing firing signals from a firing circuit 16. A circuit to stop said firing signal is as shown in FIG. 10 and explained above.

The explanation has been given on half-cycle of alternative current. When a reverse current is developed at the opposite half cycle, another circuit is caused to operate. In other words, the production of firing signal is stopped by means of a circuit consisting of a resistor 110, a diode 111, a resistor 112, a transistor 113, a resistor 114, a condenser 115, resistors 116, 117 and 118, a transistor 119, a resistor 120 and the AND circuit 121. In FIG. 11, reference numeral 122 indicates a positive bias terminal; reference numeral 123 a zero bias terminal; and reference numeral 124 a negative bias terminal.

Said reverse current detecting circuit does not make erroneous action even if a voltage between the anode and the cathode of the thyristor is a distorted wave containing a high-frequency component.

Having thus illustrated and described preferred embodiments of this invention, it is to be understood that the principle of this invention is not limited thereto but various other embodiments are conceivable without departing from the scope of claims of this invention given below.

1. A thyristor circuit device characterized in that said thyristor circuit device consists of feeder lines having a plurality of AC power sources, thyristors connected to said feeder lines, a firing circuit which applies to gates of said thyristors a voltage having the pulse duration determined within the time between the point of time corresponding to 90° phase angle of lead and the point of time corresponding to 90° phase angle of lag, taking as the reference point the point of time when a phase voltage of said AC power source rises from the zero voltage, a circuit to detect a reverse current in said feeder lines and a circuit to turn said thyristors off in accordance with a signal detected by said circuit to detect a reverse current.

2. A thyristor circuit device as claimed in claim 1 characterized in that said firing circuit produces a firing signal which lasts for the time corresponding to half-cycle at 90° phase angle of leads, taking as the reference point the point of time when a phase voltage of said AC power source rises from the zero voltage.

3. A thyristor circuit device as claimed in claim 1 characterized in that said circuit to detect a reverse current is constructed so as to utilize a sharp change in a voltage between the anodes and cathodes of said thyristors.

4. A thyristor circuit device as claimed in claim 2 characterized in that said circuit to detect a reverse current is constructed so as to utilize a sharp change in a voltage between the anodes and the cathodes of said thyristors.

5. A thyristor circuit device characterized in that said thyristor circuit device consists of feeder lines having a plurality of AC power sources, thyristors connected to said feeder lines, a firing circuit which applies to gates of said thyristors a voltage having the pulse duration determined within the time between the point of time corresponding to 90° phase angle of lead and the point of time corresponding to 90° phase angle of lag, taking as the reference point the point of time when a phase voltage of said AC power source rises from the zero voltage, a circuit to detect a reverse current in said feeder lines, a circuit to turn said thyristors off in accordance with a signal detected by circuit to detect a reverse current, a circuit to compare each voltage at both ends of said thyristors, and a circuit to fire said thyristors in accordance with a signal detected by said circuit to compare each voltage at both ends of said thyristors.

6. A thyristor circuit device as claimed in claim 5 characterized in that said firing circuit produces a firing signal which lasts for the time corresponding to half-cycle at 90° phase angle of lead, taking as the reference point the point of time when a phase voltage of said AC power source rises from the zero voltage.

7. A thyristor circuit device as claimed in claim 5 characterized in that said circuit to detect a reverse current is constructed so as to utilize a sharp change in a voltage between the anodes and the cathodes of said thyristors.

8. A thyristor circuit device as claimed in claim 6 characterized in that said circuit to detect a reverse current is constructed so as to utilize a sharp change in a voltage between the anodes and the cathodes of said thyristors.